United States Patent
Hsu et al.

(10) Patent No.: US 8,546,992 B2
(45) Date of Patent: Oct. 1, 2013

(54) INSULATION STRUCTURE FOR WINDING OF MOTOR STATOR

(75) Inventors: Kuo-Shu Hsu, Nan Tou Hsien (TW); Chih-Yung Li, Nan Tou Hsien (TW); Chin-Hui Lin, Taichung (TW)

(73) Assignee: Headline Electric Co., Ltd., Nan Tou Hsien (TW)

( * ) Notice: Subject to any disclaimer, the term of this patent is extended or adjusted under 35 U.S.C. 154(b) by 258 days.

(21) Appl. No.: 13/117,102

(22) Filed: May 26, 2011

(65) Prior Publication Data

US 2012/0086299 A1    Apr. 12, 2012

(30) Foreign Application Priority Data

Oct. 12, 2010    (TW) ................................ 99219675 U

(51) Int. Cl.
*H02K 3/34*    (2006.01)
(52) U.S. Cl.
USPC ........................................................ 310/215
(58) Field of Classification Search
USPC ................... 310/215, 214, 216.105, 216.114, 310/216.115
See application file for complete search history.

(56) References Cited

U.S. PATENT DOCUMENTS

| | | | |
|---|---|---|---|
| 6,930,427 B2 * | 8/2005 | Grant et al. | 310/216.016 |
| 2002/0130580 A1 * | 9/2002 | Arai et al. | 310/214 |
| 2010/0141079 A1 * | 6/2010 | Chu et al. | 310/215 |
| 2011/0109189 A1 * | 5/2011 | Taema | 310/215 |
| 2011/0273053 A1 * | 11/2011 | Oka et al. | 310/215 |
| 2012/0080976 A1 * | 4/2012 | Oka et al. | 310/215 |

FOREIGN PATENT DOCUMENTS

WO    WO 2010/100890    * 9/2010

* cited by examiner

*Primary Examiner* — Nguyen N Hanh
(74) *Attorney, Agent, or Firm* — Leong C. Lei

(57) ABSTRACT

The present invention provides an improved insulation structure for winding of motor stator, which is an improved design of structure for providing effective insulation for stator winding and improving winding volume. A stator piece that is arranged inside a motor body forms arrayed holes for wire winding. The holes receive insulation plates that are configured to correspond to the shape of the holes to be fit therein. Opposite ends of the stator piece receive end rings to fix and assemble thereto. End tabs formed at edges of the insulation plates are arranged to fit into and cover edge surface of a winding slot of each of the holes to realize complete coverage of the insulation for stator winding thereby ensuing operation safety when the motor is activated and put into operation.

2 Claims, 6 Drawing Sheets

INSULATION STRUCTURE FOR WINDING OF MOTOR STATOR

TECHNICAL FIELD OF THE INVENTION

The present invention generally relates to an improved insulation structure for winding of motor stator, which ensures easy insertion of stator winding insulation plate and provides a large area insulation to thereby realize safe and practical operation of insulation in the operation of motor.

DESCRIPTION OF THE PRIOR ART

A conventional brushless motor comprises internally arranged stator and wound coils insulation structure for controlling rotation, of which an illustrative arrangement is shown in FIGS. 6-8. According to arrayed holes 31 that are circumferentially arranged for winding purposes, the winding insulation is arranged to have a set of end plates 33 from each of which insulation plates 32 extend mounted to opposite ends of the holes with the insulation plates 32 that are tubular in shape being fit into the arrayed holes 31 from the opposite ends thereof to overlap each other, whereby undesired contact and interference is eliminated between the wound copper wires 34 and the stator 30. Based on a winding slot 35 that is formed in one side of each of the arrayed holes 31 and shows an open configuration, end edges of the associated insulation plate 32 is set close to side faces of the winding slot 35 to eliminate potential interference occurring in winding the wires. Such an overlapped insulation arrangement suffers a major drawback that fitting the insulation plates 32 in an overlapping fashion requires an assembling operation by fitting from opposite ends, which leads to an inefficiency of correct alignment for fitting. Further, the insulation plates 32 are often of a thickness of approximately 0.5 mm, whereby the overall wall thickness at any side, after the overlapped assembling, makes a significant reduction of the available area inside each of the arrayed holes 31, which in turn reduces the turns and volume of the copper wires 34 wound thereon, severely affecting the performance of motor output. As a consequence, for an output that is above a predetermined rated horsepower; when the output horsepower is increased, an influence of the overall outside size by the increase of output is that the circumference and radius of the stator 30 must be properly expanded to increase the available winding space of each of the arrayed holes 31. This enlarges the outside radius and volume. Taking a commonly used ¼ HP motor as an example, the motor has an outside diameter that may reach 144 mm. The overall size of the motor takes a large amount of space, and the motor is bulky, which makes installation difficult. Further, for the currently adopted requirement of winding and insulation spacing for high horsepower output arrangements, according to safety regulation of UL, the conduction and insulation spacing must reach the stipulated requirement of 2.4 mm. However, the fitting arrangement of the conventional insulation plates 32 provides such a fitting result that covers only a location close to the side edges of the slot opening. This is of severe insufficiency. Because of the requirement for operation safety, except enlarging the motor, thickened insulation plates 32 are needed for the fitting assembling, otherwise the operation safety regulation cannot be met. Apparently, the conventional insulation structure of the motor stator must be further improved.

SUMMARY OF THE INVENTION

In view of the above discussed drawback of a motor winding insulation structure occurring in the use thereof; which leads to concerns of operation safety and inconvenience of assembling, the present invention aims to provide an improved insulation structure for winding of motor stator, which comprises a set of open-configuration insulation plate that is structured to completely cover arrayed holes for stator windings so as to realize complete coverage of edge surfaces of each of the arrayed holes, thereby effectively improving the drawback of poor use that the conventional insulations structure does not meet the safety requirements.

The primary objective of the present invention is that increased insulation spacing can be provided between a winding and an inner circumferential surface of a stator through the use of open-configuration sheet-like insulation plate completely covering edge surfaces of wire-winding arrayed holes of the stator body thereby realizing operation safety of motor and convenience of wire winding.

The foregoing objectives and summary provide only a brief introduction to the present invention. To fully appreciate these and other objects of the present invention as well as the invention itself; all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
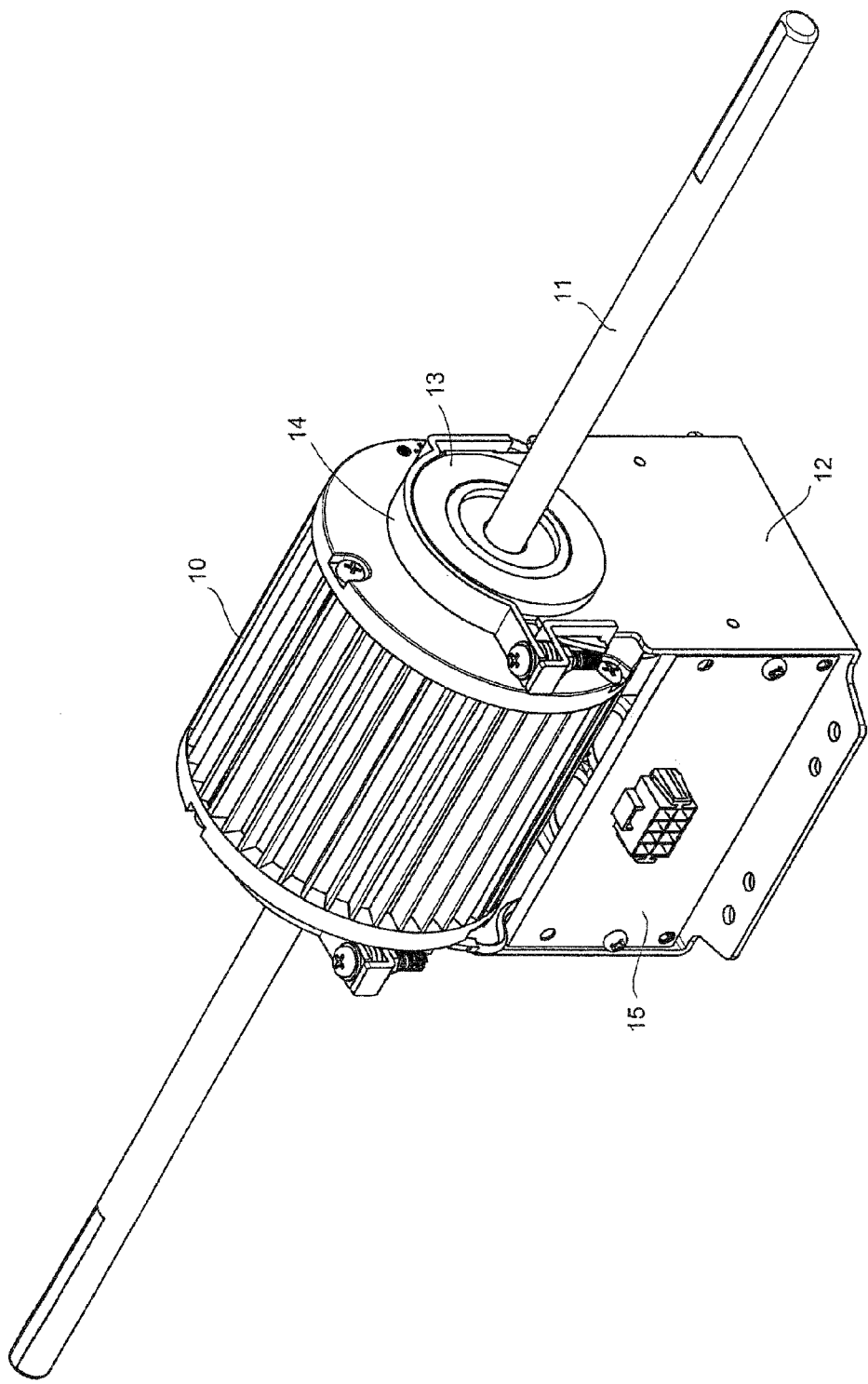
FIG. 1 is a perspective view showing an assembled motor installation according to the present invention.
Figure 2:
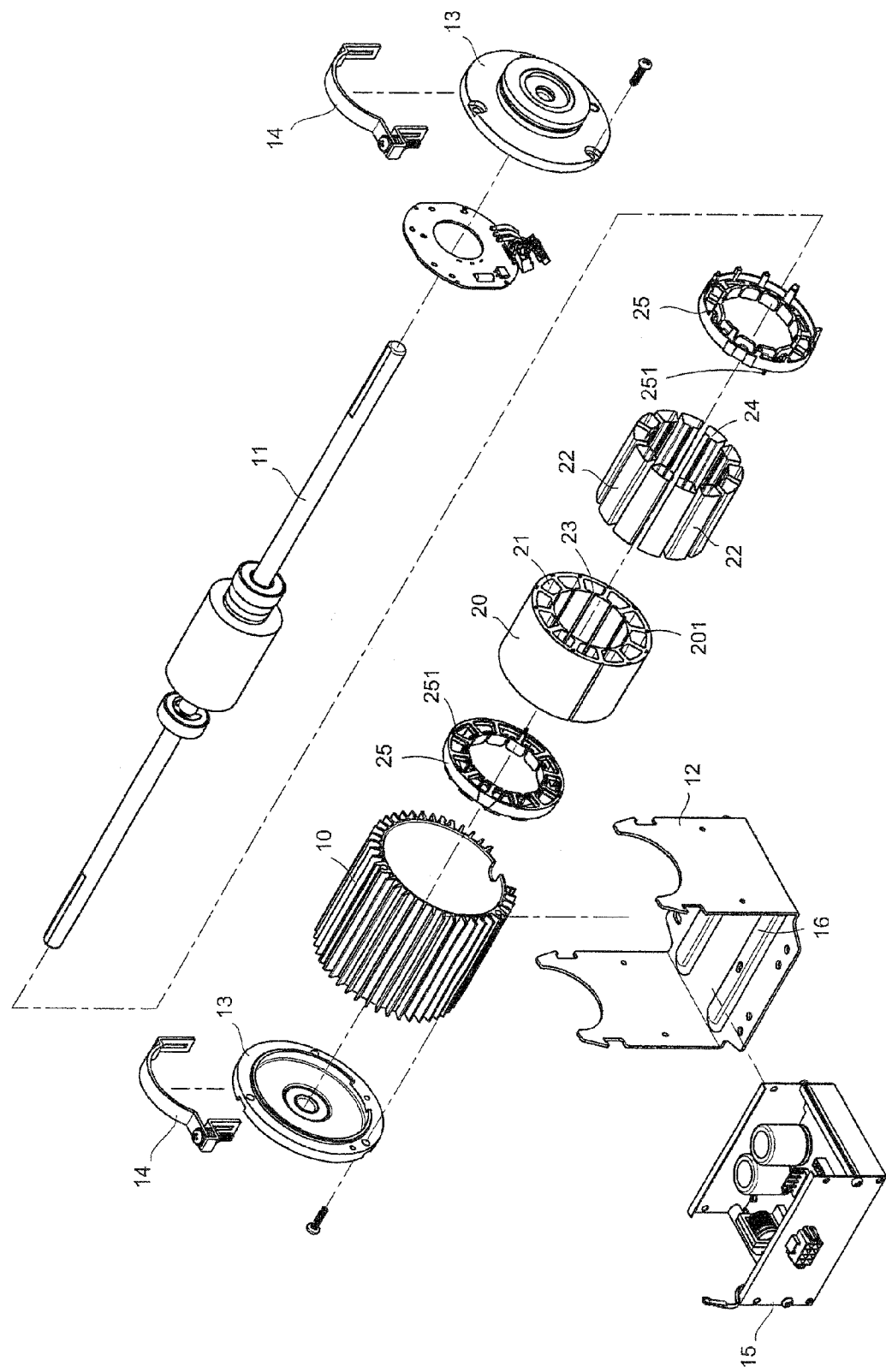
FIG. 2 is an exploded view of the structure of the motor installation according to the present invention.
Figure 3:
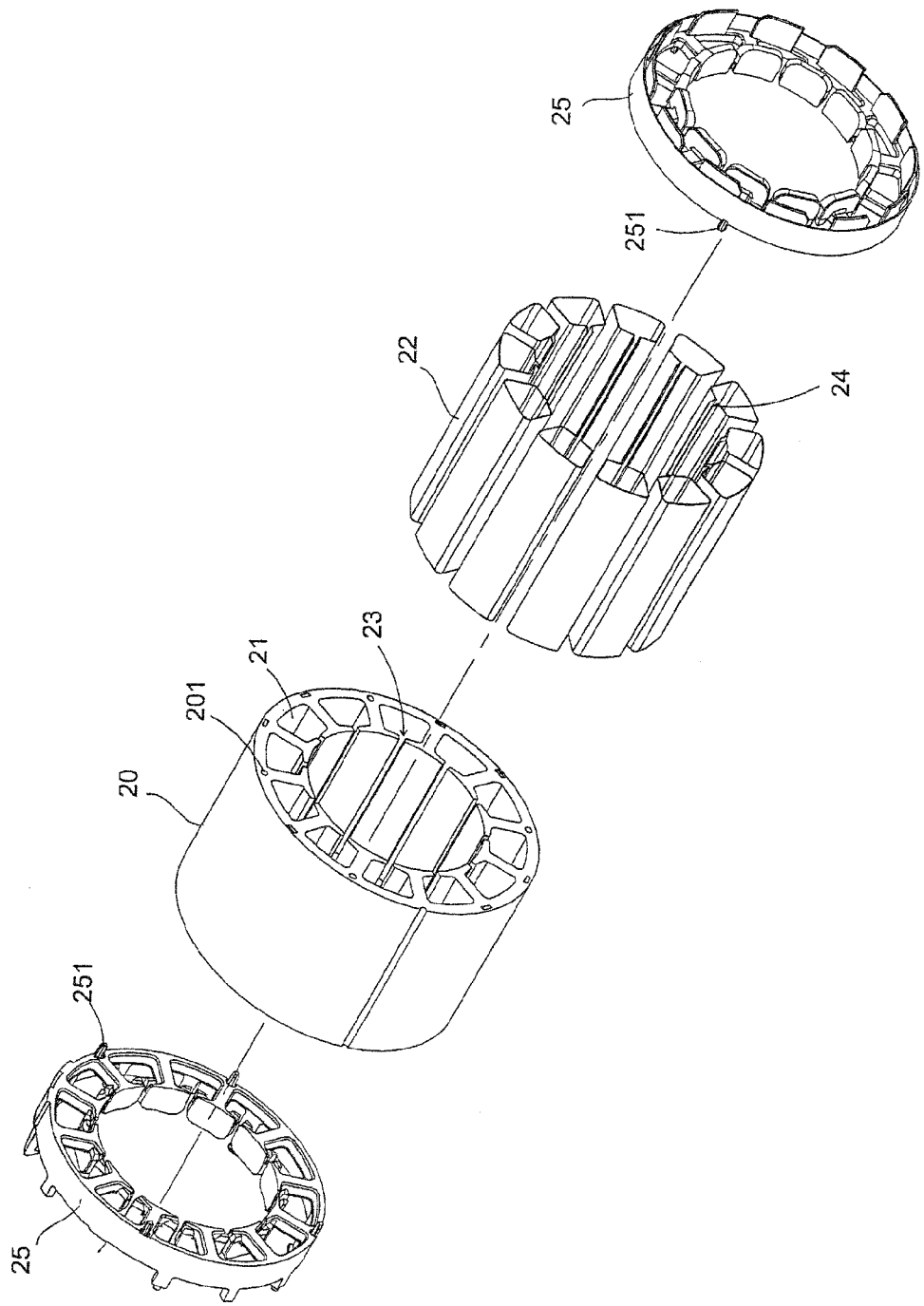
FIG. 3 is an exploded view illustrating an insulation arrangement of stator piece of the motor according to the present invention.
Figure 4:
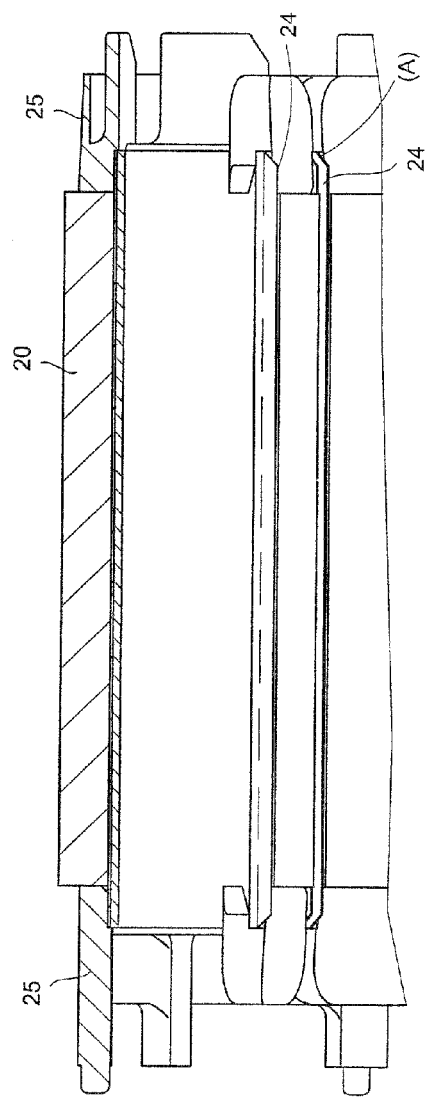
FIG. 4 is a cross-sectional view of the insulation arrangement of the stator piece according to the present invention.
Figure 7:
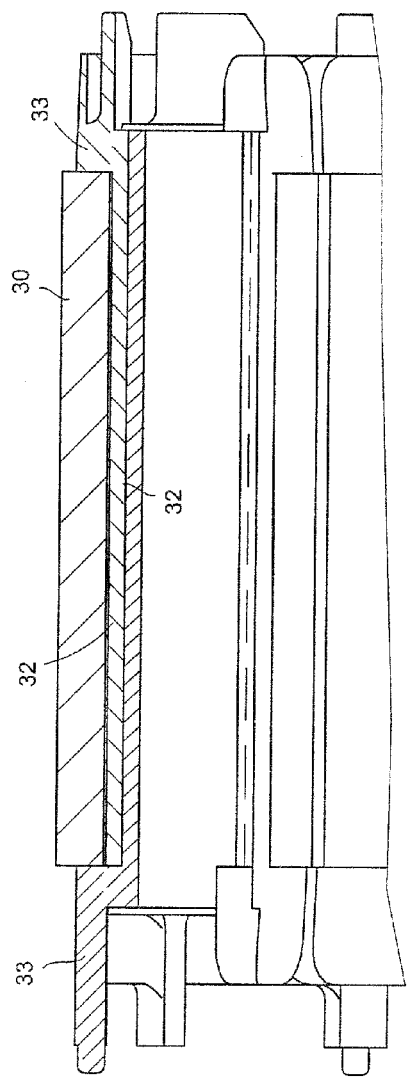
FIG. 7 is a cross-sectional view of the insulation arrangement of the conventional stator piece.
Figure 5:
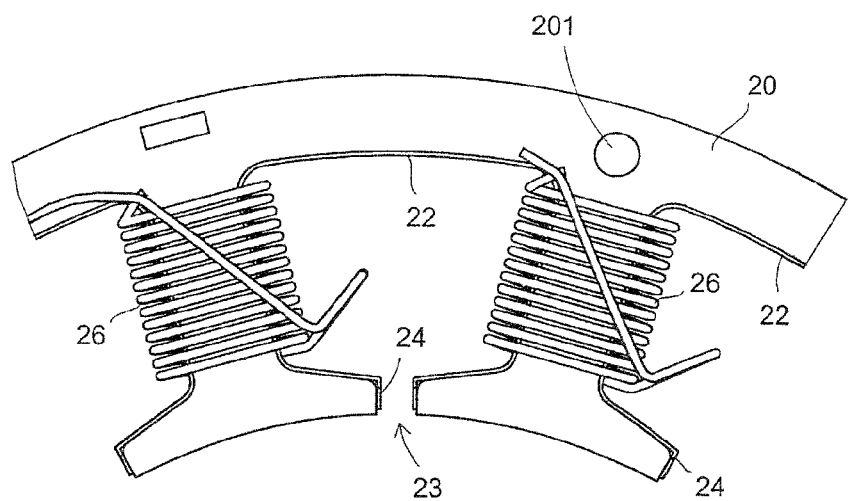
FIG. 5 is a schematic view illustrating the insulation arrangement with copper wire wound thereon for the stator piece according to the present invention.
Figure 8:
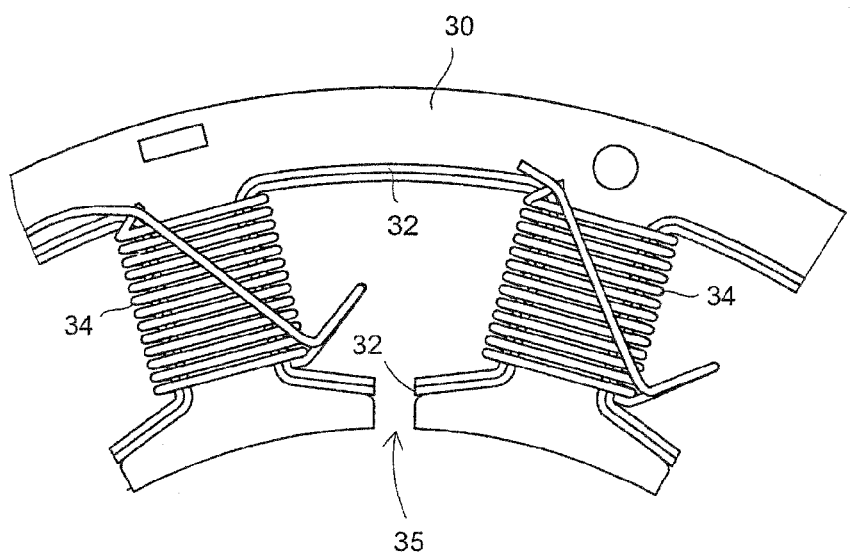
FIG. 8 is a schematic view illustrating the insulation arrangement with copper wire wound thereon for the conventional stator piece.
Figure 6:
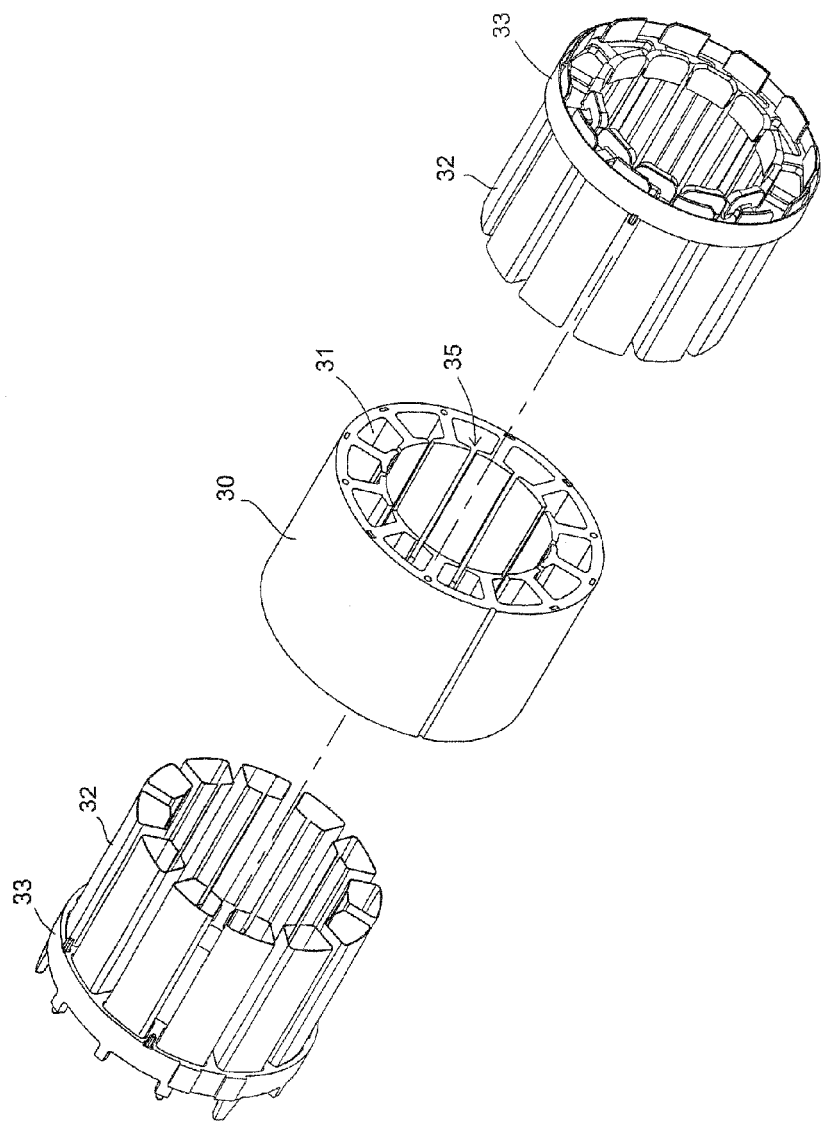
FIG. 6 is an exploded view illustrating an insulation arrangement of a conventional stator piece.

The present invention provides an improved insulation structure for winding of motor stator, which is generally an improved design for insulation structure of stator winding, of which the improved structure, as illustrated in FIGS. 1-5, comprises a motor body 10 and a motor spindle 11 extending outside the motor body. The motor body 10 is supported by and assembled with a support rack 12. The body 10 has opposite ends that form spindle seat outer circumferential surfaces closed by spindle seat side plates 13 to which anti-vibration rings are fit and assembled. The complete motor installation so assembled is positioned on the U-shaped support rack 12 for assembling with top ends receiving corresponding securing plates 14 of curved configuration to fix and cover outer circumferences of the anti-vibration rings of the spindle seats to thereby secure the motor installation. The support rack 12 forms an assembling space within which a pre-assembled driving device 15 is mounted to realize coupling and assembling at a location closest to the motor body 10, with a bottom thereof being raised through formation of stamped ribs 16 for elevated assembling that facilitates securing of bolts from the outer side. The design improvement of the present invention resides on an improvement of insulation arrangement of a winding of a stator piece 20 assembled inside the motor body 10, wherein arrayed holes 21 for winding purposes are formed circumferentially in the stator piece 20 and a thin plate like insulation plate 22 is set to bend and attach to each of the arrayed holes in such a way that based on the opening configuration of the hole, the insulation plate 22 has end edges that are bent to form projecting end tabs 24 corresponding to a slot opening of an open winding slot 23 of the hole so as to cover an inner circumferential surface of the stator piece 20 and extend outside the slot opening and that upper and lower ends of each end tabs 24 are formed as inclined lead-in angle (A) to facilitate winding operation. Opposite ends of the stator piece 20 are each provided with an end ring 25 for covering purposes to properly fit into and position the insulation plates 22 to ensure the insulation plates to be correctly positioned inside the arrayed holes 21 for being covered and assembled, with mating ring surfaces provided with pegs 251 for directly fitting into insertion apertures 201 circumferentially formed in the ends of the stator pieces 20 for fixing and positioning, Afterwards, the assembly is set in a winding machine for performance of winding operations of copper wires 26 to complete the structure of power generation device of the motor installation.

As for the insulation structure design for winding of the stator piece 20 according to the present invention, the most prominent improvement is associated with the winding space of the stator piece 20, where because of the insulation plate 22 being assembled by fitting a single-layered sheet like material of which the thickness is less than 0.2 mm and because of the single layer shows an open configuration identical to the hole configuration of the respective one of the arrayed holes 21, a reliable and easy operation of fitting the plate into the recessed space of the respective one of the arrayed holes 21 of the stator piece 20 can be realized with the plate being closely attached to and neatly covering inner surface of the hole opening by means of the resilient compliance of the plate material and further extending to cover opposite edge surfaces of the slot opening of the winding slot 23. The single-layered arrangement allows of expansion to the maximum availability of the internal winding space thereby maximizing the turns and volume of wound coils. Further, with the end tabs 24 of the insulation plate 22 being arranged to extend outside the opposite edge surfaces of the winding slot 23, the insulation is extended to the inner circumferential surface of the stator piece 20, whereby when the winding operation of the copper wire 26 is performed, besides an increased number of turns being allowed and located closer to outside portion of the bottom of the arrayed hole 21, the copper wire 26 may be allowed of a maximum area winding operation in respect of the winding volume and outside diameter. As such, the output performance of the motor installation is significantly improved, thereby realizing a design for maximum horsepower output with the same motor outside volume, whereby the design and use of the motor installation is an improved design for light-weighted and compact high-efficiency structure. It is worth mentioning that because of the outward extension of the end tabs 24 of the insulation plate 22 and thus coverage of the two sides of the winding slot 23, the insulation spacing between the wound copper wire 26 and the inner circumferential metal surface of the stator piece 20 is significantly increased, which effectively realizes insulation based operation safety for high horsepower output. This is because an edge surface of the winding, when wound around the extended coverage distance of the end tabs 24, may easily exceed the requirement for safety spacing of 2.4 mm to thereby completely meet the needs for insulation based safety operation. The structural arrangement of the whole stator piece 20 does not require additional increase or application of special curved winding, or modification for reducing winding layer. For the diameter of a ¼ HP motor, the outside configuration of the motor installation having the insulation structure according to the present invention can be made with a 100 mm diameter, thereby significantly reducing the volume and the overall weight and thus realizing the value of being practical, light-weight, and high efficiency. In view of the improved design of whole insulation structure, the motor installation can be made practical, light-weight and possessing the output capability of high efficiency. The structural arrangement according to the present invention is novel in view of the insulation designs of the category and provides the advantages of convenience and practicability.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. An insulation structure of winding of motor stator, comprising a motor body, an internally arranged stator piece, and a rotatable motor spindle member, characterized in that the stator piece forms circumferentially arrayed winding holes within each of which a thin sheet like insulation plate is set by being bent and attached thereto, each hole comprising an open winding slot, ends of the insulation plate being bent to form projecting end tabs to cover outside an inner circumferential surface of the stator piece, opposite ends of the stator piece being each provided with an end ring that is fit into and fix the insulation plates to correctly position the insulation plates inside the holes thereby ensuring operation safety of the winding insulation, wherein each of the end tabs has upper and lower end forming inclined lead-in angles.

2. An insulation structure of winding of motor stator, comprising a motor body, an internally arranged stator piece, and a rotatable motor spindle member, characterized in that the stator piece forms circumferentially arrayed winding holes within each of which a thin sheet like insulation plate is set by being bent and attached thereto, each hole comprising an open winding slot, ends of the insulation plate being bent to form projecting end tabs to cover outside an inner circumferential surface of the stator piece, opposite ends of the stator piece being provided with an end ring that is fit into and fix the insulation plates to correctly position the insulation plates inside the holes thereby ensuring operation safety of the winding insulation, wherein the end ring has a ring surface forming equally-space pegs that are fit into insertion apertures circumferentially formed in the stator piece for fixing and positioning.

* * * * *